(12) United States Patent
Shi

(10) Patent No.: US 10,453,410 B2
(45) Date of Patent: Oct. 22, 2019

(54) GATE DRIVING CIRCUIT

(71) Applicant: Shenzhen China Star Optoelectronics Technology Co., Ltd., Shenzhen (CN)

(72) Inventor: Longqiang Shi, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 15/327,316

(22) PCT Filed: Dec. 20, 2016

(86) PCT No.: PCT/CN2016/110943
§ 371 (c)(1),
(2) Date: Aug. 3, 2018

(87) PCT Pub. No.: WO2018/040389
PCT Pub. Date: Mar. 8, 2018

(65) Prior Publication Data
US 2019/0156776 A1    May 23, 2019

(30) Foreign Application Priority Data
Aug. 31, 2016 (CN) .......................... 2016 1 0796870

(51) Int. Cl.
*G09G 3/36* (2006.01)
*G02F 1/1368* (2006.01)

(52) U.S. Cl.
CPC ......... *G09G 3/3677* (2013.01); *G02F 1/1368* (2013.01); *G09G 2300/0408* (2013.01);
(Continued)

(58) Field of Classification Search
CPC .............. G09G 3/3677; G09G 3/3266; G09G 2310/0286; G09G 2310/0267; G11C 27/04
See application file for complete search history.

(56) References Cited

U.S. PATENT DOCUMENTS

2013/0027378 A1    1/2013  Lee et al.
2015/0187312 A1*   7/2015  Dai ....................... G09G 3/3648
                                                        345/213
(Continued)

FOREIGN PATENT DOCUMENTS

CN    101093647 A    12/2007
CN    101187743 A    5/2008
(Continued)

OTHER PUBLICATIONS

Chinese Office Action for related Chinese Application No. 201610796870.3; action dated May 24, 2018; (7 pages).
(Continued)

*Primary Examiner* — Yuzhen Shen (57) ABSTRACT

Disclosed is a gate driving circuit, which includes multi-stages of gate driving units. Each stage of gate driving unit includes an input control module, an output control module, a pull-down module, a pull-down maintenance module, and an electric current compensation module. The electric current compensation module effectively compensates an electric potential of an output end of a present stage of gate driving unit, so that a stability of the gate driving circuit can be greatly improved, and a display effect of a liquid crystal display panel can be improved.

20 Claims, 3 Drawing Sheets

(52) U.S. Cl.
CPC ............ *G09G 2300/0426* (2013.01); *G09G 2300/0809* (2013.01); *G09G 2310/0264* (2013.01); *G09G 2310/08* (2013.01)

(56) References Cited

U.S. PATENT DOCUMENTS

| | | | | |
|---|---|---|---|---|
| 2015/0279288 | A1* | 10/2015 | Dai | G02F 1/13306 345/690 |
| 2016/0125830 | A1* | 5/2016 | Xiao | G09G 3/3677 345/92 |
| 2016/0140922 | A1* | 5/2016 | Dai | G11C 19/287 |
| 2016/0260403 | A1* | 9/2016 | Dai | G09G 3/36 |
| 2016/0284304 | A1* | 9/2016 | Dai | G09G 3/36 |
| 2016/0307531 | A1* | 10/2016 | Xiao | G09G 3/3677 |
| 2016/0343321 | A1* | 11/2016 | Xiao | G09G 3/3648 |
| 2017/0148403 | A1* | 5/2017 | Dai | G02F 1/1368 |

FOREIGN PATENT DOCUMENTS

| | | | | |
|---|---|---|---|---|
| CN | 101604551 | A | 12/2009 | |
| CN | 103680453 | A * | 3/2014 | ......... G02F 1/13306 |
| CN | 103730094 | A * | 4/2014 | ........... G09G 3/3648 |
| CN | 104008741 | A * | 8/2014 | ............... G09G 3/36 |
| CN | 104064158 | A * | 9/2014 | ............... G09G 3/36 |
| CN | 104064159 | A | 9/2014 | |
| CN | 104078019 | A | 10/2014 | |
| CN | 104078022 | A | 10/2014 | |
| CN | 104376824 | A * | 2/2015 | ........... G11C 19/287 |
| CN | 104392701 | A | 3/2015 | |
| CN | 104464657 | A * | 3/2015 | ........... G09G 3/3648 |
| CN | 104464660 | A * | 3/2015 | ............... G09G 3/36 |
| CN | 104700803 | A | 6/2015 | |
| CN | 104766575 | A * | 7/2015 | ........... G09G 3/3677 |
| CN | 104766584 | A * | 7/2015 | ........... G02F 1/1368 |
| CN | 105280134 | A | 1/2016 | |
| CN | 105355187 | A | 2/2016 | |
| JP | 2008003602 | A | 1/2008 | |

OTHER PUBLICATIONS

International Search Report and Written Opinion for related International Application No. PCT/CN2016/110943; report dated Mar. 8, 2018; (11 pages).

* cited by examiner

Fig. 1

Prior Art

GATE DRIVING CIRCUIT

This application claims the priority of Chinese patent application CN 201610796870.3, entitled "Gate driving circuit" and filed on Aug. 31, 2016, the entirety of which is incorporated herein by reference.

FIELD OF THE INVENTION

The present disclosure relates to the technical field of display, and in particular, to a gate driving circuit.

BACKGROUND OF THE INVENTION

In GOA (Gate Drive On Array) technology, a gate driver is manufactured on a thin film transistor array substrate, via a manufacturing procedure of a thin film transistor (TFT) array, so as to achieve row-by-row scanning.

The GOA technology is widely applied and researched due to its benefit for the narrow frame design on a gate driving side of a display screen and reduction of cost.

With development of the oxide semiconductor thin film transistor (for example, IGZO, indium gallium zinc oxide thin film transistor), the corresponding integrated circuits surrounding the panel of the oxide semiconductor have become research focus. Since a carrier mobility ratio of the oxide semiconductor thin film transistor is 20-30 times that of an amorphous silicon thin film transistor, a charge-discharge rate of the thin film transistor on a pixel electrode can be greatly improved. It can be seen that, the oxide semiconductor thin film transistor can improve a response speed of a pixel and obtain a faster refresh rate so as to greatly improve a row scanning rate of the pixel and thus achieve an ultrahigh resolution in TFT-LCD. The GOA circuit of the oxide semiconductor thin film transistor may replace the GOA circuit of the amorphous silicon in the future.

However, in the prior art, the development of GOA circuit of the oxide semiconductor thin film transistor is few since there are many problems brought about by an electric property per se of the oxide semiconductor thin film transistor to be overcome. Specifically, IGZO belongs to an N type semiconductor and the hole number thereof is small. Hence, IGZO-TFT usually shows an excellent negative bias stress (NBTS) property. However, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences the GOA circuit.

SUMMARY OF THE INVENTION

The technical problem to be solved by the present disclosure is as follows. In the prior art, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences the GOA circuit.

In order to solve the above technical problem, the present disclosure provides a gate driving circuit.

The technical solution of the present invention will be described as follows.

The gate driving circuit comprises multi-stages of gate driving units in series connection with one another. Each stage of gate driving unit is configured to output a scanning signal through an output end thereof according to a scanning signal output by a previous stage of gate driving unit, a scanning signal output by a next stage of gate driving unit, and a clock signal.

Each stage of gate driving unit comprises:

an input control module, configured to be controlled by the scanning signal output by the previous stage of gate driving unit so as to control an electric potential of a first node;

an output control module, connected to the first node, and configured to control an electric potential of an output end of a present stage of gate driving unit according to the electric potential of the first node;

a pull-down module, connected to the output control module, and configured to pull down the electric potential of the output end of the present stage of gate driving unit according to an electric potential of a second node;

a pull-down maintenance module, connected to the pull-down module, and configured to maintain the electric potential of the second node during a non-scanning period so that the electric potential of the output end of the present stage of gate driving unit is maintained in a negative electric potential; and an electric current compensation module, connected to the output control module, and configured to increase an electric current flowing through the output end of the present stage of gate driving unit.

Preferably, the pull-down maintenance module comprises:

a fifty-first transistor, with a gate and a drain thereof both being connected to a constant high voltage output end, and a source thereof being connected to a fourth node;

a fifty-second transistor, with a gate thereof being connected to the first node, a drain thereof being connected to the fourth node, and a source thereof being connected to a first negative electric potential output end;

a fifty-third transistor, with a gate thereof being connected to the fourth node, a drain thereof being connected to the constant high voltage output end, and a source thereof being connected to the second node;

a fifty-fourth transistor, with a gate thereof being connected to the first node, a drain thereof being connected to the second node, and a source thereof being connected to a third node;

a seventy-third transistor, with a gate thereof being connected to the fourth node, a drain thereof being connected to the constant high voltage output end, and a source thereof being connected to the third node;

a seventy-fourth transistor, with a gate thereof being connected to the first node, a drain thereof being connected to the third node, and a source thereof being connected to a constant low voltage output end;

an eighty-first transistor, with a gate thereof being connected to the first node, a drain thereof being connected to the constant high voltage output end, and a source thereof being connected to a fifth node;

an eighty-second transistor, with a gate thereof being connected to the second node, a drain thereof being connected to the constant low voltage output end, and a source thereof being connected to the fifth node;

a forty-second transistor, with a gate thereof being connected to the second node, a drain thereof being connected to the first node, and a source thereof being connected to the fifth node; and a thirty-second transistor, with a gate thereof being connected to the second node, a drain thereof being connected to the output end of the present stage of gate driving unit, and a source thereof being connected to the first negative electric potential output end, wherein an electric potential of the constant low voltage output end is lower than an electric potential of the first negative electric potential output end.

Preferably, an electric potential of the constant high voltage output end is in a range from 20 to 30V.

Preferably, the electric potential of the constant low voltage output end and the electric potential of the first negative electric potential output end are both in a range from −5 to −8V.

Preferably, the electric current compensation module comprises a twenty-third transistor and a twenty-fourth transistor. A gate of the twenty-third transistor is connected to the first node, a drain thereof is connected to the output end of the present stage of gate driving unit, and a source thereof is connected to a source of the twenty-fourth transistor. A gate and a drain of the twenty-fourth transistor are both connected to the fourth node.

Preferably, the input control module comprises an eleventh transistor. A gate of the eleventh transistor is connected to a constant high voltage output end, a drain thereof is connected to the output end of the previous stage of gate driving unit, and a source thereof is connected to the first node.

Preferably, the output control module comprises:

a twenty-first transistor, with a gate thereof being connected to the first node, a drain thereof being connected to an output end of the clock signal, and a source thereof being connected to the output end of the present stage of gate driving unit;

a twenty-second transistor, with a gate thereof being connected to the first node, a drain thereof being connected to the output end of the clock signal, and a source thereof being connected to a driving output end of the present stage of gate driving unit; and a bootstrap capacitor, wherein the first node is connected to the output end of the present stage of gate driving unit through the bootstrap capacitor.

Preferably, the pull-down module comprises a fortieth transistor and a forty-first transistor. A gate and a drain of the fortieth transistor are both connected to the first node, and a source thereof is connected to a drain of the forty-first transistor. A gate of the forty-first transistor is connected to an output end of the next stage of gate driving unit, and a source thereof is connected to the output end of the present stage of gate driving unit.

Compared with the prior art, one embodiment or a plurality of embodiments in the aforesaid technical solutions can have the following advantages or beneficial effects.

According to the present disclosure, after the gate driving circuit works for a period, the electric current compensation module can compensate an electric current obtained from the output end of the present stage of gate driving unit so as to prevent the problem of decrease of the electric potential of the output end resulted from the forward drift of the threshold voltage of the transistor and ensure normal charging of the pixel unit. Hence, according to the present disclosure, a stability of the gate driving circuit is greatly improved, which is beneficial for improvement of a display effect of a liquid crystal display panel.

Other features and advantages of the present disclosure will be further explained in the following description, and partially become self-evident therefrom, or be understood through the embodiments of the present disclosure. The objectives and advantages of the present disclosure will be achieved through the structure specifically pointed out in the description, claims, and the accompanying drawings.

BRIEF DESCRIPTION OF THE DRAWINGS

The accompanying drawings provide further understandings of the present disclosure and constitute one part of the description. The drawings are used for interpreting the present disclosure together with the embodiments, not for limiting the present disclosure. In the drawings.

DETAILED DESCRIPTION OF THE EMBODIMENTS

The present disclosure will be explained in details with reference to the embodiments and the accompanying drawings, whereby it can be fully understood how to solve the technical problem by the technical means according to the present disclosure and achieve the technical effects thereof, and thus the technical solution according to the present disclosure can be implemented. It should be noted that, as long as there is no conflict, all the technical features mentioned in all the embodiments may be combined together in any manner, and the technical solutions obtained in this manner all fall within the scope of the present disclosure.

In the prior art, a positive bias stress property of IGZO-TFT is not good enough. The prolonged positive bias stress will result in forward drift of a threshold voltage (Vth) of TFT and thus a turning-on speed of IGZO-TFT device becomes slow, which seriously influences a gate driving circuit.

Specifically, the gate driving circuit in the prior art includes multi-stages of gate driving units. Each stage of gate driving unit includes an output control module and a pull-down maintenance module. With increasing of working period of the gate driving circuit, a transistor used for connecting an output end of a present stage of gate driving unit in the output control module will bear a severe stress. Therefore, forward drift of a threshold voltage Vth of the transistor will easily occur, which will result in that it is difficult to turn on the transistor. Consequently, under a same voltage, an electric current will become smaller, which will result in undercharge and electric potential decreasing of an output end of the present stage of gate driving unit, and thus influence a normal display effect of a liquid crystal display panel. Moreover, an electric potential of a fourth node in the pull-down maintenance module will be pulled up.

Figure 1:
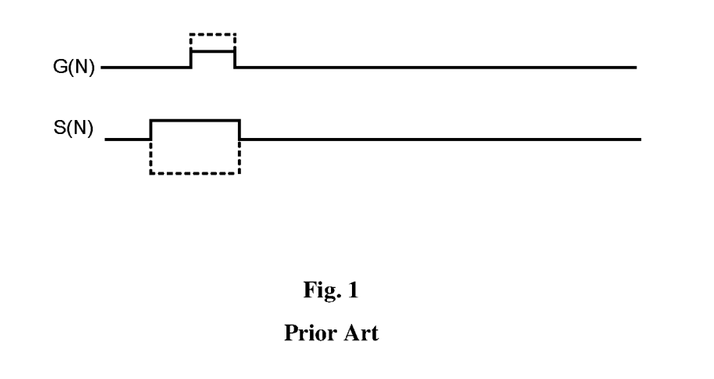
FIG. 1 schematically shows an abnormal electric potential output of a fourth node and an output end of a gate driving unit caused by drift rightwards of a threshold voltage of a thin film transistor in the prior art.

FIG. 1 schematically shows an abnormal electric potential output of a fourth node and an output end of a gate driving unit caused by drift rightwards of a threshold voltage of a thin film transistor in the prior art. As shown in FIG. 1, an electric potential of a fourth node S(N) is higher than a normal electric potential (shown by a dotted line), which results in that an electric potential of an output end G(N) of the gate driving unit is lower than a normal electric potential (shown by a dotted line). As a result, undercharge of the output end will be generated, and a display effect of a liquid crystal display device will be affected.

In order to solve the above technical problem, the embodiment of the present disclosure provides a gate driving circuit.

Figure 2:
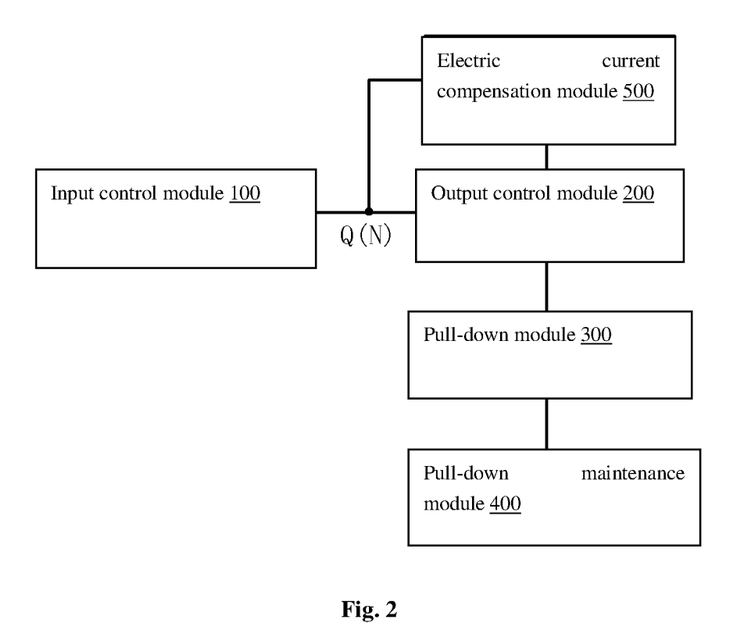
FIG. 2 schematically shows modules of the gate driving unit according to one embodiment of the present disclosure.
Figure 3:
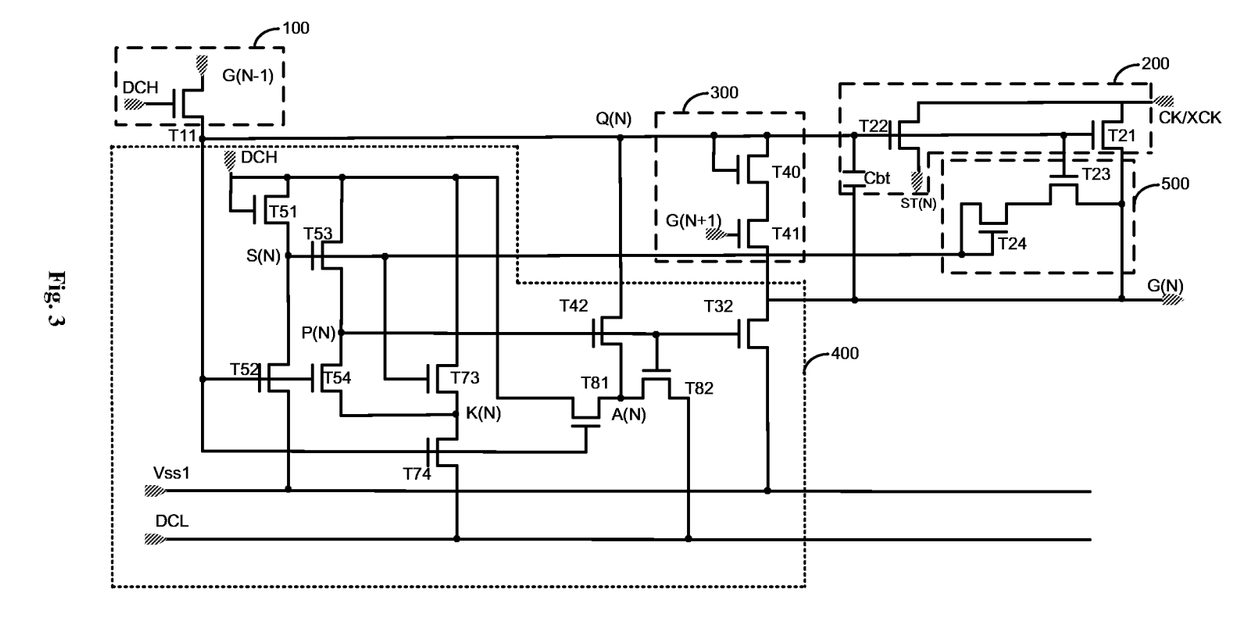
FIG. 3 schematically shows a circuit diagram of the gate driving unit according to the embodiment of the present disclosure.

FIG. 2 schematically shows modules of the gate driving unit according to the present embodiment. FIG. 3 schematically shows a circuit diagram of the gate driving unit according to the present embodiment.

According to the embodiment of the present disclosure, the gate driving circuit comprises multi-stages of gate driving units in series connection with one another. Each stage of gate driving unit is configured to output a scanning signal through an output end thereof according to a scanning signal output by a previous stage of gate driving unit, a scanning signal output by a next stage of gate driving unit, and a clock signal. Circuit structures of the multi-stages of gate driving units comprised in the gate driving circuit are the same as one another.

As shown in FIG. 2, the gate driving unit comprises an input control module 100, an output control module 200, a pull-down module 300, a pull-down maintenance module 400, and an electric current compensation module 500.

The input control module 100 is controlled by a scanning signal G(N−1) output by the previous stage of gate driving unit so as to control an electric potential of a first node Q(N). The output control module 200 is connected to the first node Q(N). The output control module 200 controls an electric potential of an output end G(N) of a present stage of gate driving unit according to the electric potential of the first node Q(N). The pull-down module 300 is connected to the output control module 200. The pull-down module 300 pulls down the electric potential of the output end G(N) of the present stage of gate driving unit according to an electric potential of a second node P(N). The pull-down maintenance module 400 is connected to the pull-down module 300. The pull-down maintenance module 400 maintains the electric potential of the second node P(N) during a non-scanning period so that the electric potential of the output end G(N) of the present stage of gate driving unit is maintained in a negative electric potential. The electric current compensation module 500 is connected to the output control module 200. The electric current compensation module 500 is used to increase an electric current flowing through the output end G(N) of the present stage of gate driving unit.

Figure 4:
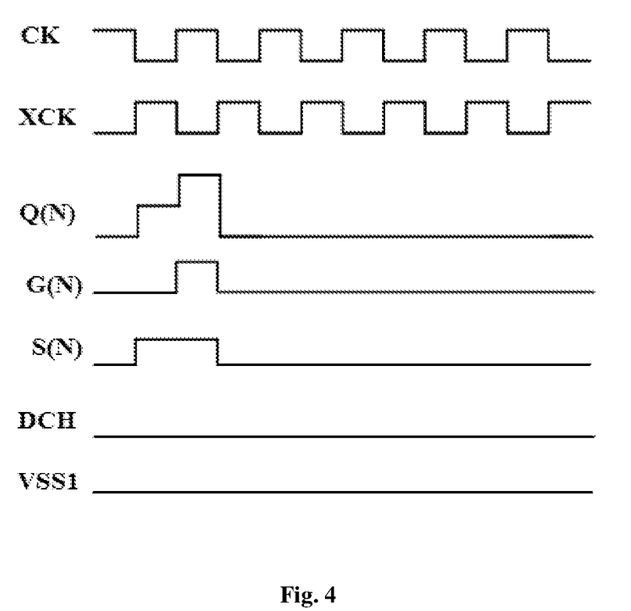
FIG. 4 schematically shows waveform arrangements and output waveforms of key nodes in the gate driving unit according to the embodiment of the present disclosure.

Circuit composition of each module and working principle thereof will be illustrated in detail hereinafter with reference to FIG. 3 and FIG. 4.

The input control module 100 comprises an eleventh transistor T11. A gate of the eleventh transistor T11 is connected to a constant high voltage output end DCH, a drain thereof is connected to the output end G(N−1) of the previous stage of gate driving unit, and a source thereof is connected to the first node Q(N).

The output control module 200 comprises a twenty-first transistor T21, a twenty-second transistor T22 and a bootstrap capacitor Cbt. A gate of the twenty-first transistor T21 is connected to the first node Q(N), a drain thereof is connected to an output end CK/XCK of the clock signal, and a source thereof is connected to the output end G(N) of the present stage of gate driving unit. A gate of the twenty-second transistor T22 is connected to the first node Q(N), a drain thereof is connected to the output end CK/XCK of the clock signal, and a source thereof is connected to a driving output end ST(N) of the present stage of gate driving unit. The first node Q(N) is connected to the output end G(N) of the present stage of gate driving unit through the bootstrap capacitor Cbt.

The pull-down module 300 comprises a fortieth transistor T40 and a forty-first transistor T41. A gate and a drain of the fortieth transistor T40 are both connected to the first node Q(N), and a source thereof is connected to a drain of the forty-first transistor T41. A gate of the forty-first transistor T41 is connected to an output end G(N+1) of the next stage of gate driving unit, and a source thereof is connected to the output end G(N) of the present stage of gate driving unit.

The pull-down maintenance module 400 comprises a fifty-first transistor T51, a fifty-second transistor T52, a fifty-third transistor T53, a fifty-fourth transistor T54, a seventy-third transistor T73, a seventy-fourth transistor T74, an eighty-first transistor T81, an eighty-second transistor T82, a forty-second transistor T42, and a thirty-second transistor T32.

A gate and a drain of the fifty-first transistor T51 are both connected to a constant high voltage output end DCH, and a source thereof is connected to a fourth node S(N). A gate of the fifty-second transistor T52 is connected to the first node Q(N), a drain thereof is connected to the fourth node S(N), and a source thereof is connected to a first negative electric potential output end VSS1. A gate of the fifty-third transistor T53 is connected to the fourth node S(N), a drain thereof is connected to the constant high voltage output end DCH, and a source thereof is connected to the second node P(N). A gate of the fifty-fourth transistor T54 is connected to the first node Q(N), a drain thereof is connected to the second node P(N), and a source thereof is connected to a third node K(N) A gate of the seventy-third transistor T73 is connected to the fourth node S(N), a drain thereof is connected to the constant high voltage output end DCH, and a source thereof is connected to the third node K(N). A gate of the seventy-fourth transistor T74 is connected to the first node Q(N), a drain thereof is connected to the third node S(N), and a source thereof is connected to a constant low voltage output end DCL. A gate of the eighty-first transistor T81 is connected to the first node Q(N), a drain thereof is connected to the constant high voltage output end DCH, and a source thereof is connected to a fifth node A(N). A gate of the eighty-second transistor T82 is connected to the second node P(N), a drain thereof is connected to the constant low voltage output end DCL, and a source thereof is connected to the fifth node A(N). A gate of the forty-second transistor T42 is connected to the second node P(N), a drain thereof is connected to the first node Q(N), and a source thereof is connected to the fifth node A(N). A gate of the thirty-second transistor T32 is connected to the second node P(N), a drain thereof is connected to the output end G(N) of the present stage of gate driving unit, and a source thereof is connected to the first negative electric potential output end VSS1.

Here, it should be noted that, an electric potential of the constant low voltage output end DCL is lower than an electric potential of the first negative electric potential output end VSS1. According to one preferable embodiment of the present disclosure, an electric potential of the constant high voltage output end DCH is in a range from 20- to 30V. The electric potential of the constant low voltage output end DCL and the electric potential of the first negative electric potential output end VSS1 are both in a range from −5 to −8V. CK and XCK as shown in FIG. 4 are clock signals with opposite phases.

The pull-down maintenance module 400 adopts a special double inverters design, wherein the fifty-first transistor T51, the fifty-second transistor T52, the fifty-third transistor T53 and the fifty-fourth transistor T54 constitute a major inverter, and the seventy-third transistor T73 and the seventy-fourth transistor T74 constitute an auxiliary inverter. The major inverter plays a role of controlling the thirty-second transistor T32 and the forty-second transistor T42. The auxiliary inverter plays a role of providing a low electric potential for the major inverter during a functioning period, and providing a suitable high electric potential for the major inverter during a non-functioning period to reduce an electric leakage of the fifty-fourth transistor T54 so as to ensure that the major inverter can produce a relatively high electric potential during the non-functioning period. The auxiliary inverter controls the seventy-third transistor T73 through the fourth node S(N) of the major inverter, whereby an element number of the auxiliary inverter can be reduced. That is, no additional element needs to be provided therein to produce a waveform similar to that of the fourth node S(N) so as to control the seventy-third transistor T73.

During the functioning period, after the auxiliary inverter is driven by a high voltage of the fourth node S(N) and a low voltage of the constant low voltage output end DCL, the fifty-second transistor T52 is pulled down to the electric potential of the first negative electric potential output end VSS1, and the seventy-fourth transistor T74 is turned on when the first node Q(N) is in a high voltage and is pulled down to a voltage of the constant high voltage output end DCH. Accordingly, the third node K(N) is in a much lower electric potential and the second node P(N) is also pulled down to a much lower electric potential. That is, the auxiliary inverter provides a low electric potential for the major inverter during the functioning period. Hence, electric leakage, which is caused by a physical property that the thirty-second transistor T32 and the forty-second transistor T42 have a lower threshold voltage or their threshold voltage approaches 0V, can be prevented, and it can be ensured that the pull-down maintenance module 400 can be pulled down normally during the functioning period.

During the non-functioning period, the fifty-second transistor T52, the fifty-fourth transistor T54 and the seventy-fourth transistor T74 are all turned off. Since the gate of the fifty-fourth transistor T54 is connected to the first node Q(N) and the source thereof is connected to the third node K(N), the gate of the fifty-fourth transistor T54 is in a negative electric potential and the source thereof is in a positive electric potential. Hence, a voltage difference between the gate and the source of the fifty-fourth transistor T54 is a negative value with a relatively large absolute value, and thus the fifty-fourth transistor T54 can be turned off very well and its electric leakage can be reduced. That is, the auxiliary inverter provides a suitable high electric potential for the major inverter during the non-functioning period to reduce the electric leakage of the fifty-fourth transistor T54. In this manner, it can be ensured that the pull-down maintenance module 400 is in a relatively high electric potential during the non-functioning period, and the first node Q(N) and the output end G(N) can be maintained in a low electric potential. Moreover, when the third node K(N) is in the high electric potential, it also plays a role of voltage sharing, which can help to drive the electric potential of the second node P(N) to be higher, and thus the electric potential of the second node P(N) can be further stabilized.

The electric current compensation module 500 comprises a twenty-third transistor T23 and a twenty-fourth transistor T24. A gate of the twenty-third transistor T23 is connected to the first node Q(N), a drain thereof is connected to the output end G(N) of the present stage of gate driving unit, and a source thereof is connected to a source of the twenty-fourth transistor T24. A gate and a drain of the twenty-fourth transistor T24 are both connected to the fourth node S(N).

In the following part, a function of the electric current compensation module 500 will be specifically illustrated.

In order to solve the problem of the undercharge of the output end G(N) resulted from the forward drift of the threshold voltage Vth easily occurred in the twenty-first transistor T21, a module for compensating the forward drift of the threshold voltage Vth in the twenty-first transistor T21 is provided in the present embodiment. The electric current compensation module 500 can compensate an electric current flowing through the twenty-first transistor T21 so as to improve a reliability of the gate driving circuit.

Specifically, when the gate driving circuit begins to work, the fifty-second transistor T52 works normally. At this moment, a resistance of the fifty-second transistor T52 is very small. Hence, when the first node Q(N) is in a high electric potential, the sharing voltage of the fifty-second transistor T52 is very small and thus the fourth node S(N) is in the low electric potential. Therefore, when the twenty-fourth transistor T24 is turned off, the electric current compensation module 500 will not generate an electric current. Therefore, the electric current finally obtained by the output end G(N) of the present stage of gate driving unit is merely the electric current flowing through the twenty-first transistor T21. It can be seen that, when the gate driving circuit begins to work initially, the normal charging of a pixel unit can be ensured without an operation of the electric current compensation module 500.

After a period of working of the gate driving circuit, the forward drift of the threshold voltage Vth occurs in the fifty-second transistor T52. At this moment, the resistance of the fifty-second transistor T52 is large. Hence, when the first node Q(N) is in the high electric potential, the sharing voltage of the fifty-second transistor T52 is very large and thus the electric potential of the fourth node S(N) is pulled up. Both the twenty-fourth transistor T24 and the twenty-third transistor T23 are in the turned-on status and the electric current compensation module 500 begins to work. Therefore, the electric current finally obtained by the output end G(N) of the present stage of gate driving unit is a total electric current of the electric current flowing through the twenty-first transistor T21 and the electric current flowing through the electric current compensation module 500. It can be seen that, after the working of the gate driving circuit for a period, the electric current compensation module 500 can compensate the electric current finally obtained by the output end G(N) so as to ensure the normal charging of the pixel unit.

According to the present embodiment, after the gate driving circuit works for a period, the electric current compensation module can compensate an electric current obtained from the output end of the present stage of gate driving unit so as to prevent the problem of decrease of the electric potential of the output end resulted from the forward drift of the threshold voltage of the transistor and ensure normal charging of the pixel unit. Hence, according to the present embodiment, a stability of the gate driving circuit is greatly improved, which is beneficial for improvement of a display effect of a liquid crystal display panel.

The above embodiments are described only for better understanding, rather than restricting, the present disclosure. Any person skilled in the art can make amendments to the implementing forms or details without departing from the spirit and scope of the present disclosure. The protection scope of the present disclosure shall be determined by the scope as defined in the claims.

The invention claimed is:

1. A gate driving circuit, comprising multi-stages of gate driving units in series connection with one another,
wherein each stage of gate driving unit is configured to output a scanning signal through an output end thereof according to a scanning signal output by a previous stage of gate driving unit, a scanning signal output by a next stage of gate driving unit, and a clock signal; and
wherein each stage of gate driving unit comprises:
an input control module, configured to be controlled by the scanning signal output by the previous stage of gate driving unit so as to control an electric potential of a first node;
an output control module, connected to the first node, and configured to control an electric potential of an output end of a present stage of gate driving unit according to the electric potential of the first node;
a pull-down module, connected to the output control module, and configured to pull down the electric potential of the output end of the present stage of gate driving unit according to an electric potential of a second node;
a pull-down maintenance module, connected to the pull-down module, and configured to maintain the electric potential of the second node during a non-scanning period so that the electric potential of the output end of the present stage of gate driving unit is maintained in a negative electric potential; and
an electric current compensation module, connected to the output control module, and configured to increase an electric current flowing through the output end of the present stage of gate driving unit.

2. The gate driving circuit according to claim 1, wherein the input control module comprises an eleventh transistor; and
wherein a gate of the eleventh transistor is connected to a constant high voltage output end, a drain thereof is connected to the output end of the previous stage of gate driving unit, and a source thereof is connected to the first node.

3. The gate driving circuit according to claim 2, wherein the output control module comprises:
a twenty-first transistor, with a gate thereof being connected to the first node, a drain thereof being connected to an output end of the clock signal, and a source thereof being connected to the output end of the present stage of gate driving unit;
a twenty-second transistor, with a gate thereof being connected to the first node, a drain thereof being connected to the output end of the clock signal, and a source thereof being connected to a driving output end of the present stage of gate driving unit; and
a bootstrap capacitor, wherein the first node is connected to the output end of the present stage of gate driving unit through the bootstrap capacitor.

4. The gate driving circuit according to claim 3, wherein the pull-down module comprises a fortieth transistor and a forty-first transistor,
wherein a gate and a drain of the fortieth transistor are both connected to the first node, and a source thereof is connected to a drain of the forty-first transistor; and
wherein a gate of the forty-first transistor is connected to an output end of the next stage of gate driving unit, and a source thereof is connected to the output end of the present stage of gate driving unit.

5. The gate driving circuit according to claim 1, wherein the pull-down maintenance module comprises:

a fifty-first transistor, with a gate and a drain thereof both being connected to a constant high voltage output end, and a source thereof being connected to a fourth node;
a fifty-second transistor, with a gate thereof being connected to the first node, a drain thereof being connected to the fourth node, and a source thereof being connected to a first negative electric potential output end;
a fifty-third transistor, with a gate thereof being connected to the fourth node, a drain thereof being connected to the constant high voltage output end, and a source thereof being connected to the second node;
a fifty-fourth transistor, with a gate thereof being connected to the first node, a drain thereof being connected to the second node, and a source thereof being connected to a third node;
a seventy-third transistor, with a gate thereof being connected to the fourth node, a drain thereof being connected to the constant high voltage output end, and a source thereof being connected to the third node;
a seventy-fourth transistor, with a gate thereof being connected to the first node, a drain thereof being connected to the third node, and a source thereof being connected to a constant low voltage output end;
an eighty-first transistor, with a gate thereof being connected to the first node, a drain thereof being connected to the constant high voltage output end, and a source thereof being connected to a fifth node;
an eighty-second transistor, with a gate thereof being connected to the second node, a drain thereof being connected to the constant low voltage output end, and a source thereof being connected to the fifth node;
a forty-second transistor, with a gate thereof being connected to the second node, a drain thereof being connected to the first node, and a source thereof being connected to the fifth node; and
a thirty-second transistor, with a gate thereof being connected to the second node, a drain thereof being connected to the output end of the present stage of gate driving unit, and a source thereof being connected to the first negative electric potential output end,
wherein an electric potential of the constant low voltage output end is lower than an electric potential of the first negative electric potential output end.

6. The gate driving circuit according to claim 5, wherein the input control module comprises an eleventh transistor; and
wherein a gate of the eleventh transistor is connected to the constant high voltage output end, a drain thereof is connected to the output end of the previous stage of gate driving unit, and a source thereof is connected to the first node.

7. The gate driving circuit according to claim 6, wherein the output control module comprises:
a twenty-first transistor, with a gate thereof being connected to the first node, a drain thereof being connected to an output end of the clock signal, and a source thereof being connected to the output end of the present stage of gate driving unit;
a twenty-second transistor, with a gate thereof being connected to the first node, a drain thereof being connected to the output end of the clock signal, and a source thereof being connected to a driving output end of the present stage of gate driving unit; and
a bootstrap capacitor, wherein the first node is connected to the output end of the present stage of gate driving unit through the bootstrap capacitor.

8. The gate driving circuit according to claim 7, wherein the pull-down module comprises a fortieth transistor and a forty-first transistor,
   wherein a gate and a drain of the fortieth transistor are both connected to the first node, and a source thereof is connected to a drain of the forty-first transistor; and
   wherein a gate of the forty-first transistor is connected to an output end of the next stage of gate driving unit, and a source thereof is connected to the output end of the present stage of gate driving unit.

9. The gate driving circuit according to claim 5, wherein an electric potential of the constant high voltage output end is in a range from 20 to 30V.

10. The gate driving circuit according to claim 9, wherein the input control module comprises an eleventh transistor; and
   wherein a gate of the eleventh transistor is connected to the constant high voltage output end, a drain thereof is connected to the output end of the previous stage of gate driving unit, and a source thereof is connected to the first node.

11. The gate driving circuit according to claim 10, wherein the output control module comprises:
   a twenty-first transistor, with a gate thereof being connected to the first node, a drain thereof being connected to an output end of the clock signal, and a source thereof being connected to the output end of the present stage of gate driving unit;
   a twenty-second transistor, with a gate thereof being connected to the first node, a drain thereof being connected to the output end of the clock signal, and a source thereof being connected to a driving output end of the present stage of gate driving unit; and
   a bootstrap capacitor, wherein the first node is connected to the output end of the present stage of gate driving unit through the bootstrap capacitor.

12. The gate driving circuit according to claim 11, wherein the pull-down module comprises a fortieth transistor and a forty-first transistor,
   wherein a gate and a drain of the fortieth transistor are both connected to the first node, and a source thereof is connected to a drain of the forty-first transistor; and
   wherein a gate of the forty-first transistor is connected to an output end of the next stage of gate driving unit, and a source thereof is connected to the output end of the present stage of gate driving unit.

13. The gate driving circuit according to claim 9, wherein the electric potential of the constant low voltage output end and the electric potential of the first negative electric potential output end are both in a range from −5 to −8V.

14. The gate driving circuit according to claim 13, wherein the input control module comprises an eleventh transistor; and
   wherein a gate of the eleventh transistor is connected to the constant high voltage output end, a drain thereof is connected to the output end of the previous stage of gate driving unit, and a source thereof is connected to the first node.

15. The gate driving circuit according to claim 14, wherein the output control module comprises:
   a twenty-first transistor, with a gate thereof being connected to the first node, a drain thereof being connected to an output end of the clock signal, and a source thereof being connected to the output end of the present stage of gate driving unit;
   a twenty-second transistor, with a gate thereof being connected to the first node, a drain thereof being connected to the output end of the clock signal, and a source thereof being connected to a driving output end of the present stage of gate driving unit; and
   a bootstrap capacitor, wherein the first node is connected to the output end of the present stage of gate driving unit through the bootstrap capacitor.

16. The gate driving circuit according to claim 15, wherein the pull-down module comprises a fortieth transistor and a forty-first transistor,
   wherein a gate and a drain of the fortieth transistor are both connected to the first node, and a source thereof is connected to a drain of the forty-first transistor; and
   wherein a gate of the forty-first transistor is connected to an output end of the next stage of gate driving unit, and a source thereof is connected to the output end of the present stage of gate driving unit.

17. The gate driving circuit according to claim 5, wherein the electric current compensation module comprises a twenty-third transistor and a twenty-fourth transistor,
   wherein a gate of the twenty-third transistor is connected to the first node, a drain thereof is connected to the output end of the present stage of gate driving unit, and a source thereof is connected to a source of the twenty-fourth transistor; and
   wherein a gate and a drain of the twenty-fourth transistor are both connected to the fourth node.

18. The gate driving circuit according to claim 17, wherein the input control module comprises an eleventh transistor; and
   wherein a gate of the eleventh transistor is connected to the constant high voltage output end, a drain thereof is connected to the output end of the previous stage of gate driving unit, and a source thereof is connected to the first node.

19. The gate driving circuit according to claim 18, wherein the output control module comprises:
   a twenty-first transistor, with a gate thereof being connected to the first node, a drain thereof being connected to an output end of the clock signal, and a source thereof being connected to the output end of the present stage of gate driving unit;
   a twenty-second transistor, with a gate thereof being connected to the first node, a drain thereof being connected to the output end of the clock signal, and a source thereof being connected to a driving output end of the present stage of gate driving unit; and
   a bootstrap capacitor, wherein the first node is connected to the output end of the present stage of gate driving unit through the bootstrap capacitor.

20. The gate driving circuit according to claim 19, wherein the pull-down module comprises a fortieth transistor and a forty-first transistor,
   wherein a gate and a drain of the fortieth transistor are both connected to the first node, and a source thereof is connected to a drain of the forty-first transistor; and
   wherein a gate of the forty-first transistor is connected to an output end of the next stage of gate driving unit, and a source thereof is connected to the output end of the present stage of gate driving unit.

* * * * *